United States Patent
Booth et al.

(10) Patent No.: US 9,689,376 B2
(45) Date of Patent: Jun. 27, 2017

(54) SEALING ARRANGEMENT FOR A WIND TURBINE

(71) Applicants: James Kenneth Booth, Brande (DK); Thorkil Munk-Hansen, Give (DK); Jacob Blach Nielsen, Engesvang (DK)

(72) Inventors: James Kenneth Booth, Brande (DK); Thorkil Munk-Hansen, Give (DK); Jacob Blach Nielsen, Engesvang (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 922 days.

(21) Appl. No.: 13/710,686

(22) Filed: Dec. 11, 2012

(65) Prior Publication Data
US 2013/0149156 A1 Jun. 13, 2013

(30) Foreign Application Priority Data
Dec. 13, 2011 (EP) .................................... 11193302

(51) Int. Cl.
| | | |
|---|---|---|
| F03D 7/02 | (2006.01) | |
| F03D 11/00 | (2006.01) | |
| F16J 15/00 | (2006.01) | |
| F16J 15/34 | (2006.01) | |

(Continued)

(52) U.S. Cl.
CPC ............ *F03D 11/00* (2013.01); *F03D 7/0248* (2013.01); *F03D 80/00* (2016.05); *F16J 15/002* (2013.01); *F16J 15/3456* (2013.01); *F16J 15/4472* (2013.01); *F05B 2240/57* (2013.01); *Y02E 10/723* (2013.01)

(58) Field of Classification Search
CPC ...... F03D 11/00; F03D 11/005; F03D 11/075; F03D 7/0248; F05B 2240/57; Y02E 10/722
USPC ...................................................... 416/169 R
See application file for complete search history.

(56) References Cited

U.S. PATENT DOCUMENTS 5,615,894 A * 4/1997 vom Schemm ......... B29C 59/02
277/559
7,815,536 B2 * 10/2010 Jansen ...................... F16H 1/28
290/55

(Continued)

FOREIGN PATENT DOCUMENTS

| CH | 653110 A5 | 12/1985 |
|---|---|---|
| CN | 2266648 Y | 11/1997 |

(Continued)

OTHER PUBLICATIONS

Zhai Qingzhi: "Electrical Machine and New Energy Generation Technology"; China Agriculture University Press, First Edition; pp. 231; 2011.

*Primary Examiner* — Ninh H Nguyen
*Assistant Examiner* — Aaron R Eastman

(57) ABSTRACT

A sealing arrangement includes an interface seal part arranged between a stationary element of a wind turbine and a rotary element of the wind turbine. The interface seal part is arranged to establish a seal between an interior of the stationary element and an exterior environment. Also a brake disc is realized to accommodate at least a portion of an interface seal part of such a sealing arrangement. Also described is a wind turbine which includes the sealing arrangement and the brake disc.

15 Claims, 4 Drawing Sheets

(51) Int. Cl.
 *F16J 15/447* (2006.01)
 *F03D 80/00* (2016.01)

(56) References Cited

U.S. PATENT DOCUMENTS

| | | | | |
|---|---|---|---|---|
| 7,994,231 | B2* | 8/2011 | Jacobs | B29C 44/08 521/134 |
| 2006/0066110 | A1* | 3/2006 | Jansen | F03D 9/002 290/44 |
| 2010/0032960 | A1* | 2/2010 | Numajiri | F03D 11/00 290/55 |
| 2010/0109333 | A1* | 5/2010 | Teipen | F03D 7/0204 290/55 |
| 2010/0133854 | A1* | 6/2010 | Jansen | F03D 11/02 290/1 C |
| 2014/0301848 | A1* | 10/2014 | Valero Lafuente | F03D 11/00 416/174 |

FOREIGN PATENT DOCUMENTS

| | | | |
|---|---|---|---|
| CN | 101764449 A | | 6/2010 |
| CN | 201714603 U | | 1/2011 |
| CN | 201723384 U | | 1/2011 |
| CN | 201786570 | * | 4/2011 |
| CN | 201786570 U | | 4/2011 |
| DE | 102009032873 A1 | | 1/2011 |
| EP | 2410636 A1 | | 1/2012 |
| EP | 2594790 A1 | | 5/2013 |
| FR | 2547889 A1 | | 12/1984 |
| GB | 602792 A | | 6/1948 |
| WO | WO 2011064006 A2 | | 6/2011 |

* cited by examiner

SEALING ARRANGEMENT FOR A WIND TURBINE

CROSS REFERENCE TO RELATED APPLICATIONS

This application claims priority of European Patent Office application No. 11193302.4 EP filed Dec. 13, 2011. All of the applications are incorporated by reference herein in their entirety.

FIELD OF INVENTION

The disclosure describes a sealing arrangement for a wind turbine; a brake disc for a wind turbine; and a wind turbine.

BACKGROUND OF INVENTION

An electrical machine such as a generator comprises many parts that must be protected from corrosion, or from the damaging effects of moisture. Wind turbines, particularly wind turbines that are located in offshore locations, are exposed to damp and salty conditions. Moisture-laden air of the containing airborne salt particles may enter through gaps and may damage electrical and metal parts.

SUMMARY OF INVENTION

Therefore, much effort is invested in prior art solutions to ensure that sensitive components are protected from such damage. For example, insofar as it is possible, individual components may be encased in a protective shroud or casing. Also, some solutions teach the application of an overpressure in a nacelle or canopy, to inhibit air or moisture from the exterior from entering the canopy. However, such efforts are cost intensive and not always very effective. The resulting damage owing to corrosion and rust and the resulting maintenance effort may increase the overall costs of running a wind farm.

An improved way of protecting the interior of a canopy from the external environment is provide by the sealing arrangement; the brake disc of claim; and the wind turbine of the independent claims.

The sealing arrangement for a wind turbine comprises an interface seal part arranged between a stationary element of the wind turbine and a rotary element of the wind turbine, which interface seal part is arranged to establish a seal between an interior of the stationary element and an exterior environment.

The sealing arrangement provides an airtight seal between the interior of the wind turbine and the environment on the exterior. In this way, components arranged in the interior of the wind turbine that are susceptible to corrosion may be protected from the harmful effects of airborne moisture in a simple, effective and economical manner, and avoids the need to hermetically wrap or encase such components separately.

The brake disc for a wind turbine, which brake disc is realized to accommodate at least a portion of an interface seal part of the sealing arrangement, such that air and moisture are prevented from passing from an exterior environment to an interior of the stationary part of the wind turbine.

The wind turbine comprises such a sealing arrangement and such a brake disc. The wind turbine may comprise a direct-drive wind turbine, in which the hub is directly attached to the rotary part of the generator, and which is not enclosed in a canopy or nacelle, but which instead abuts the canopy or nacelle.

Features are given by the dependent claims, as revealed in the following description. Features of different claim categories may be combined as appropriate to give further embodiments not described herein.

In the following, for illustration purposes only and without restricting the scope of the claims, it may be assumed that the wind turbine is a direct-drive wind turbine, for which the hub (with blades) is directly connected to the rotor, which in turn is arranged on the outside of a stationary stator. During operation of a wind turbine, it is important to be able to slow down or arrest the motion of the rotor, for example in stormy conditions or during a maintenance procedure. To this end, a generator arrangement of a wind turbine generally comprises brake disc, which is connected to the rotor and which may be halted by means of a suitable brake shoe arrangement. In the following, without restricting the scope of the claims in any way, it may be assumed that the rotary element of the wind turbine comprises such a brake disc.

The brake disc is generally circular or annular in shape, since the rotor of a wind turbine is usually essentially round. Therefore, the interface seal part may comprise an essentially annular shape corresponding to an annular shape of the rotary element of the wind turbine.

In a wind turbine such as the direct drive wind turbine, a gap may exist between a rotary part or a rotating element of the wind turbine and a stationary canopy or nacelle mounted on top of a tower. In other words, the rotary elements of the wind turbine and the stationary part are separated by a gap. Through this gap, air and moisture—possibly carrying salt and other unwanted particles—may enter the interior of the canopy. Therefore, the interface seal part may be arranged to bridge such a gap between the stationary element and the rotary element of the wind turbine.

The interface seal part may comprise any suitable element or component that may be arranged to lie against the rotary element of the wind turbine, and may be made of any suitable kind of material. The interface seal part may be made of a flexible material such as foam, or even dense foam. For example, the interface seal part may be made at least partially of a synthetic rubber foam. Such a foam may be effectively "pressed" against the surface of the brake disc and may compensate for an erratic movement of the brake disc, for example a slight lateral deviation owing to manufacturing tolerances etc. Such a lateral deviation may result in a changing gap width as the brake disc rotates during operation of the generator. By using a deformable material for the interface seal part, an effective seal may be obtained even if such erratic movements occur.

To ensure that the interface seal part effectively prevents air or moisture from entering into the interior, the interface seal part is shaped in a suitable way. For example, the interface seal part may comprise a band or annular ring that is arranged such that an outer edge of the ring presses lightly against the rotary element or brake disc.

The interface seal part may be connected to one element of the wind turbine, either the stationary or the rotary element, and arranged to lie against the other element. In an embodiment, the interface seal part is fastened to the stationary element of the wind turbine and arranged to press against a surface of the rotary element of the wind turbine. For example, the interface seal part may be bolted or otherwise detachably fastened to a suitable portion of the canopy.

The sealing arrangement may be realized such that the interface seal part lies against a flat surface of a brake disc. For example, a brake disc may comprise a central circular opening to accommodate a shaft of the generator, and this circular opening may be equipped with a flange to lie against the interface seal portion. However, in an embodiment of a brake disc for use with such a sealing arrangement, the brake disc comprises a groove or recess to accommodate an outer end of the interface seal part. In this way, the interface seal part is effectively guided by the recess formed in the brake disc. For example, if the interface seal part comprises one or more annular rings or bands, the brake disc may comprise one or more annular grooves to accommodate a tip or outer portion of such an annular band.

The recess not only improves the sealing effect of the sealing arrangement, it also serves to keep the interface seal part in shape, particularly if this is made of a relatively easily deformable material. Such an easily deformable material may be desired because of its ability to be "pressed" against the surface of the brake disc.

As mentioned above, the interface seal part may comprise a ring such as an annular rubber ring. However, a simple annular ring might be subject to undesirable deformation. Therefore in an embodiment, the interface seal part comprises a number of sealing strips, for example a number of annular sealing strips arranged to bridge the gap between the brake disc and the point at which the interface seal part is connected to the stationary element or canopy.

The interface seal part may comprise two sealing strips, since such an arrangement offers an improved degree of stability. These sealing strips could be arranged in layers, for example one on top of the other, so that they make surface contact. However, in an embodiment, the sealing strips are arranged to diverge in the direction of the rotary element. This may be achieved by using sealing strips that are a little wider than the gap between the brake disc and the point at which the sealing strips are fastened to the canopy. In this way, the two sealing strips may diverge outward to some extent to effectively "fill" a relatively wide recess in the brake disc. In an embodiment, the sealing arrangement comprises a spacer, for example a wedge-shaped spacer, arranged between two such sealing strips to ensure that the desired degree of divergence is obtained. Such a spacer may be realized so that it may also be fastened, together with the sealing strips, to the point of connection on the canopy.

The diverging arrangement of the sealing strips may compel the sealing strips to assume a concave form when the interface seal part is positioned between the stationary element and the rotary element. This favorable concave form may allow any moisture in the form of droplets or rivulets to be deflected away from the brake disc. Such droplets or rivulets may travel outwardly along the curved annular shape of the interface seal part in a downward direction, and may be collected in the base of the canopy and, for example, allowed to exit the canopy. To improve this function of the sealing arrangement, the outer surface of a seal strip may be coated or treated at least partially to provide a water-repellent surface.

The sealing strip described above may simply be made of an essentially flat band of a suitable material. However, in an embodiment, a sealing strip comprises a number of pleats, such that the sealing strip has a saw-tooth or zig-zag lateral cross-section. This pleated form may offer an increased degree of stability, may allow a sealing strip to be compressed or expanded to a greater degree than a simple flat strip, and may better able prevent moisture from coming close to the brake disc.

During operation of the wind turbine, the rotor may rotate at any speed, for example slowly or relatively quickly. The relevant outer surface of such a brake disc may be realized to be smooth enough to allow an unimpeded passage of the interface seal part. The sealing strip may also be realized to allow the brake disc to travel along the interface seal part without any significant friction, regardless of the rotational speed of the brake disc. Therefore, in an embodiment, at least one region of the interface seal part comprises a low-friction material. For example the outer edge of a sealing strip may be made of a non-stick material, or may be given a non-stick coating. A suitable material for such a non-stick surface may comprise, for example, Teflon®. Of course, in addition to or as an alternative, a relevant surface of the brake disc may be made of or coated with a non-stick material. For example, the recess of the brake disc described above may be lined with a non-stick layer.

Depending on the design of the wind turbine, any air space or gap between the canopy and the rotary element may be quite large. Such a large gap, particularly in rainy or stormy conditions, might allow excessive amounts of moisture-laden air to enter the canopy. Therefore, in an embodiment, the sealing arrangement comprises a rotary seal part arranged on the rotary element of the wind turbine such that the rotary seal part rotates along with the rotary element. This rotary seal part may be detachably connected to the rotary element, so that it may be relatively easily removed for maintenance access to the rotor. For example, the rotary seal part may be mounted onto the rotor from the outside, i.e. on the exterior of the wind turbine. Furthermore, the rotary seal part may be realized to overlap the canopy to some extent. The sealing arrangement may also comprise a stationary seal part arranged on the stationary element of the wind turbine. Such a stationary seal part may be realized as an integral part of the canopy, or may be separately formed and fastened in some suitable manner to the interior of the canopy.

The rotary seal part and the stationary seal part may be formed to act together to discourage air or moisture from entering the canopy. Therefore in an embodiment, the stationary seal part and the rotary seal part are realized to provide a nested arrangement in the assembled state of the sealing arrangement. For example, one of these seal parts may be formed to partially enclose the other seal part. In one embodiment, the stationary seal part might be realized to have an elongated V-shaped cross-section, while the rotary seal part might be realized to have a triangular or wedge-shaped cross-section, such that the "wedge" is contained within the "V".

To further improve the functionality of the sealing arrangement, this might include a brush seal between the rotary seal part and the stationary seal part. Such a brush seal effectively prevents small airborne particles from entering the canopy.

A wind turbine may comprise an additional sealing arrangement on the other side of the brake disc. For example, in the generator cavity, a second sealing arrangement may be arranged between the brake disc and a stator housing, so that an enclosed space may be further protected from moisture or air. Such a seal may comprise an annular rotor sealing plate arranged in a nested or labyrinthine manner against a stator sealing plate, and these sealing plates may be made of a suitable durable material such as fibreglass.

BRIEF DESCRIPTION OF THE DRAWINGS

Other objects and features will become apparent from the following detailed descriptions considered in conjunction with the accompanying drawings. It is to be understood, however, that the drawings are designed solely for the purposes of illustration and not as a definition of the limits of the claims.

DETAILED DESCRIPTION OF INVENTION

In the diagrams, like numbers refer to like objects throughout. Objects in the diagrams are not necessarily drawn to scale.

Figure 1:
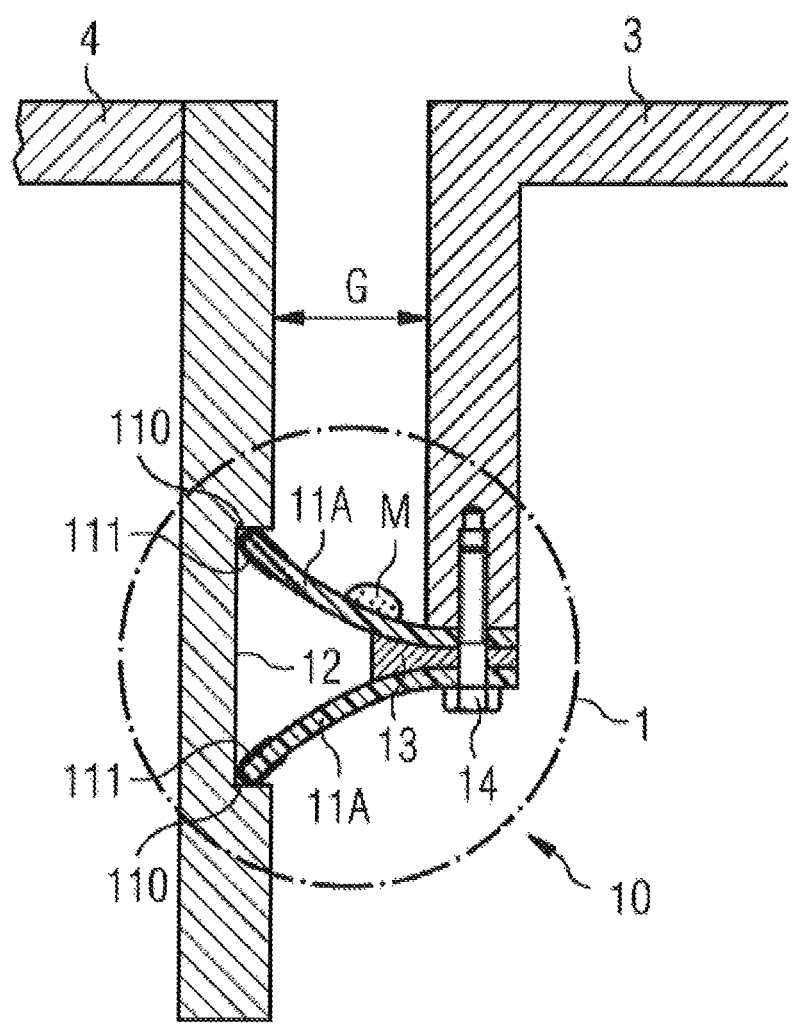
FIG. 1 shows a schematic representation of a cross-section of a sealing arrangement according to a first embodiment.

FIG. 1 shows a schematic representation of a cross-section of a sealing arrangement 1 according to a first embodiment. The diagram only shows elements of a wind turbine relevant to the disclosure, namely a brake disc 2, part of the canopy 3, and an interface seal part 10. The diagram also only shows a part of the entire arrangement 1, which will be indicated instead with the aid of the following diagrams. Here, the interface seal part 1 is fastened to a suitably formed part of the canopy 3 by means of a fastener 14, and extends in the direction of the brake disc 2. The brake disc 2 comprises an annular recess 12 shaped to contain the outer edges of the interface seal part 10, so that that an optimal seal is achieved. Here, the interface seal part 10 comprises two essentially smooth annular bands 11A or strips 11A shaped to diverge outward from another. The diverging shape may be obtained by moulding the strips 11A in an appropriate manner, or the strips 11A may be separated by a wedge-shaped spacer 13 inserted between them, as indicated here. In this embodiment, the recess 12 in the brake disc 2 and the annular strips 11A of the interface seal part 10 are dimensioned so that an outer edge 110 of a strip 11A extends towards the interior "corner" or edge given by the intersection between the base of the annular recess 12 and a side wall of the recess 12. The strips 11A are also dimensioned so that these are lightly "pressed" into the interior edges of the recess 12 in order to optimize the sealing effect of the sealing arrangement 1.

The outer portions 110 or extremities 110 of the strips 11A may be treated to provide a low-friction surface so that the brake disc 2 may smoothly travel along the interface seal part 10 without any significant friction and without the need for a lubricant. For example, as shown here, the outer portions 110 of the strips 11A are coated with a layer 111 of material such as Teflon®, which ensures a smooth passage of the brake disc 2, during operation of the generator, along the outer edges of the strips 11A as these are pushed lightly against the surfaces of the recess 12.

The curved shape of the strips 11A of the interface seal part 10 may be obtained by a strategic dimensioning and positioning of the interface seal part 10 with respect to the recess 12 of the brake disc 2, since, when the outer strip 11A is slightly wider than the gap G between the brake disc 2 and the point at which the interface seal part 10 is fastened to the canopy 3, a strip 11A will be compelled to assume the concave curved shape particularly suited to the purpose of keeping moisture away from the brake disc 2. The diagram also shows the curved contour of the interface seal part 10, which acts to encourage any accumulated liquid to move away from the brake disc 2. Any drops or rivulets of moisture M may then travel along the annular contour of the interface seal part 11A to a lower region where the moisture M may be collected or drained off to the exterior of the canopy. Furthermore, the effective sealing action of the sealing arrangement prevents air or moisture from the exterior from entering an interior 30 of the canopy 3 or nacelle 3.

Figure 2:
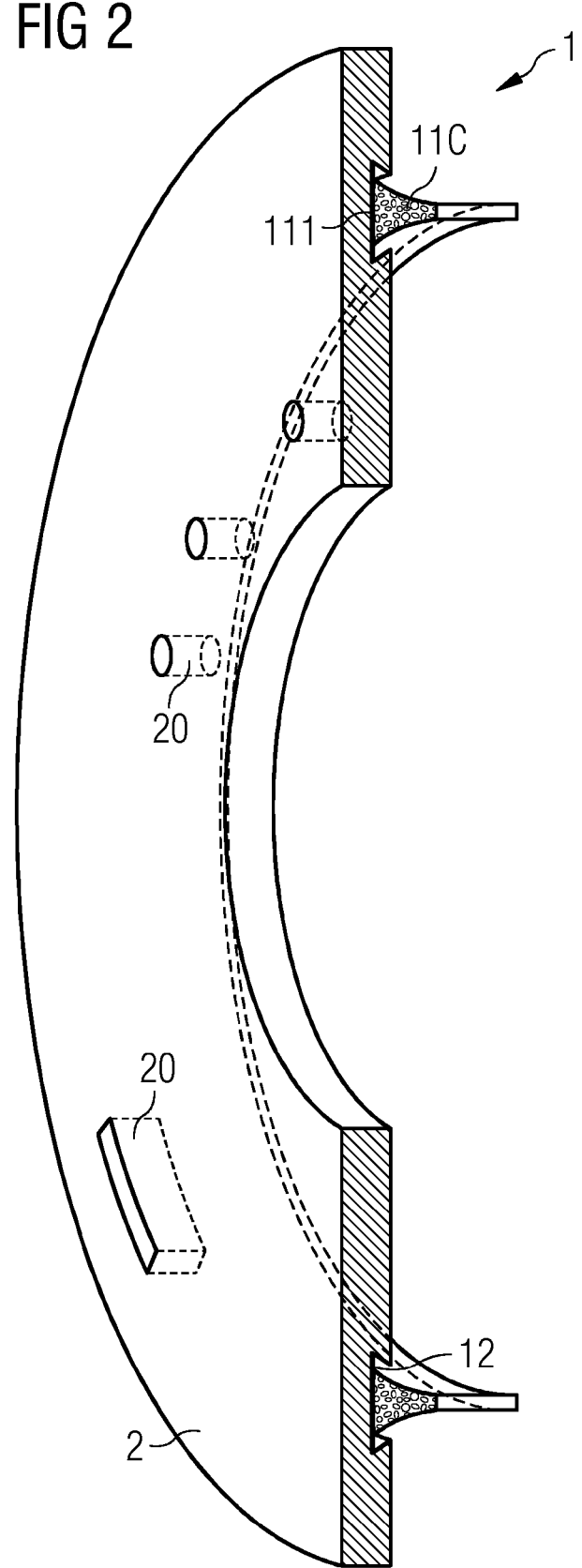
FIG. 2 shows a schematic representation of a cross-section of a sealing arrangement according to a second embodiment.

FIG. 2 shows a schematic representation of a cross-section of a sealing arrangement 1 according to a second embodiment. Here, the diagram shows half of a brake disc 2, showing the annular shapes of the brake disc 2 and the sealing arrangement 1, which in this embodiment comprises an annular foam ring with a wedge-shaped part 11C and a flat portion for fastening to the canopy. The recess 12 in this embodiment of the brake disc 2 has sharply angled interior edges to accommodate the more pointed outer edges of the foam wedge 11C. Here, the outer, wide portion of the wedge and the parts of the outer sides that come into contact with the recess 12 in the brake disc 2 may be coated with a non-stick material. Equally, the receiving surface of the recess 12 may be coated with a non-stick coating, as indicated here. The brake disc 2 comprises openings 20 that serve various purposes such as, for example, speed measurement, or to accommodate a brake stopper. Additional through-openings might be provided to allow access to a rotor magnet. Such an additional opening might be equipped with an air-tight cover or cap that may be removed when a magnet must be accessed (the rotor is stationary during such a maintenance procedure) and replaced again for normal operation of the generator.

Figure 3:
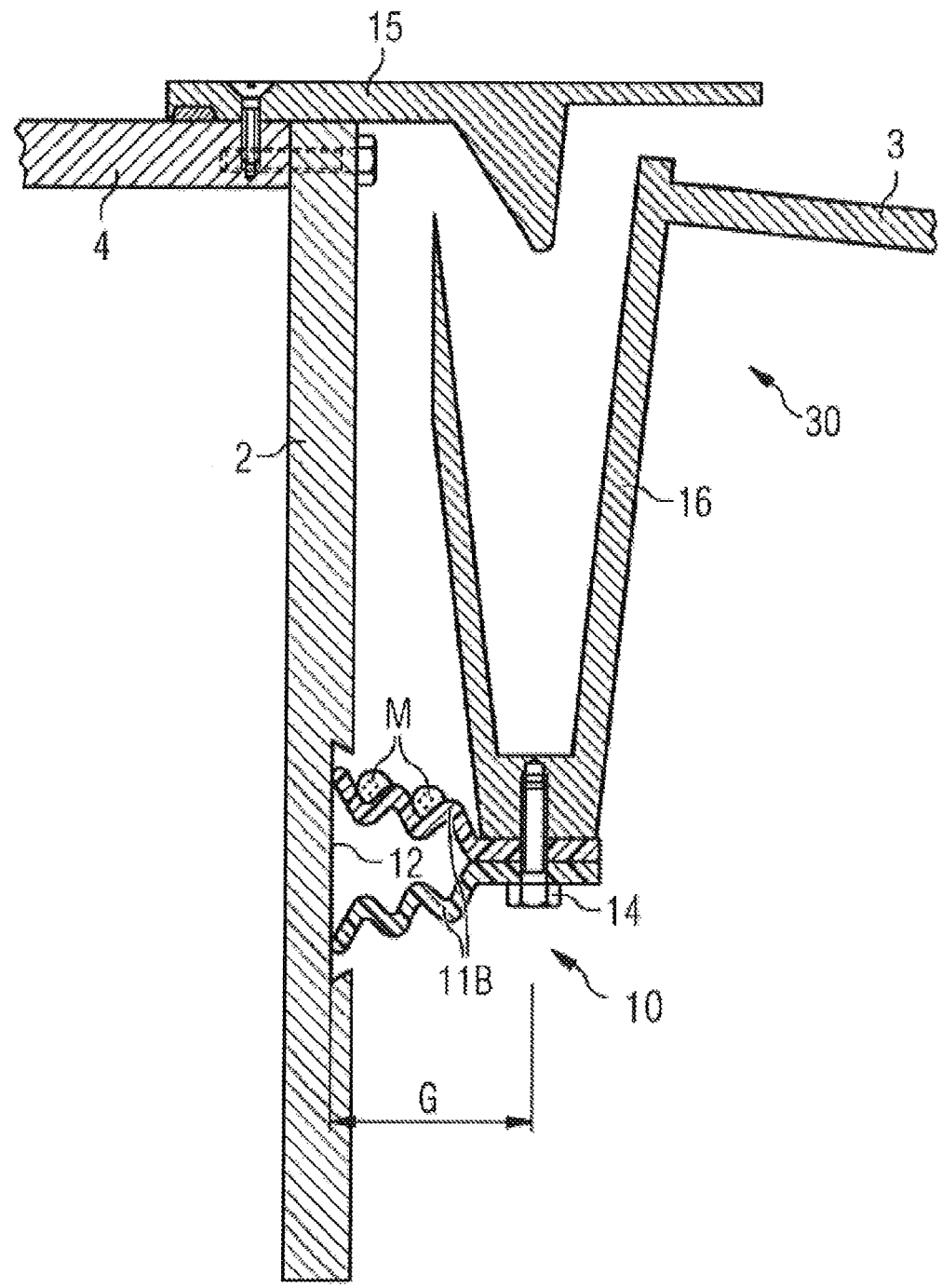
FIG. 3 shows a schematic representation of a cross-section of a sealing arrangement according to a third embodiment.

FIG. 3 shows a schematic representation of a cross-section of a sealing arrangement 1 according to a third embodiment. Here, the interface seal part 10 comprises annular pleated strips 11B, so that these may be compressed or may expand to accommodate any alteration in gap width between the brake disc 2 and the point at which the interface seal part 10 is fastened to the canopy 3. In this embodiment, the sealing arrangement 1 comprises additional seal parts 15, 16 arranged to provide additional protection against air and moisture. A rotary seal part 15 is detachably mounted to the rotor 4 of the wind turbine. A stationary seal part 16 is formed as part of the canopy 3 or connected to this. The rotary seal part 15 and the stationary seal part 16 are formed to fit together in a nested manner without direct contact.

Figure 4:
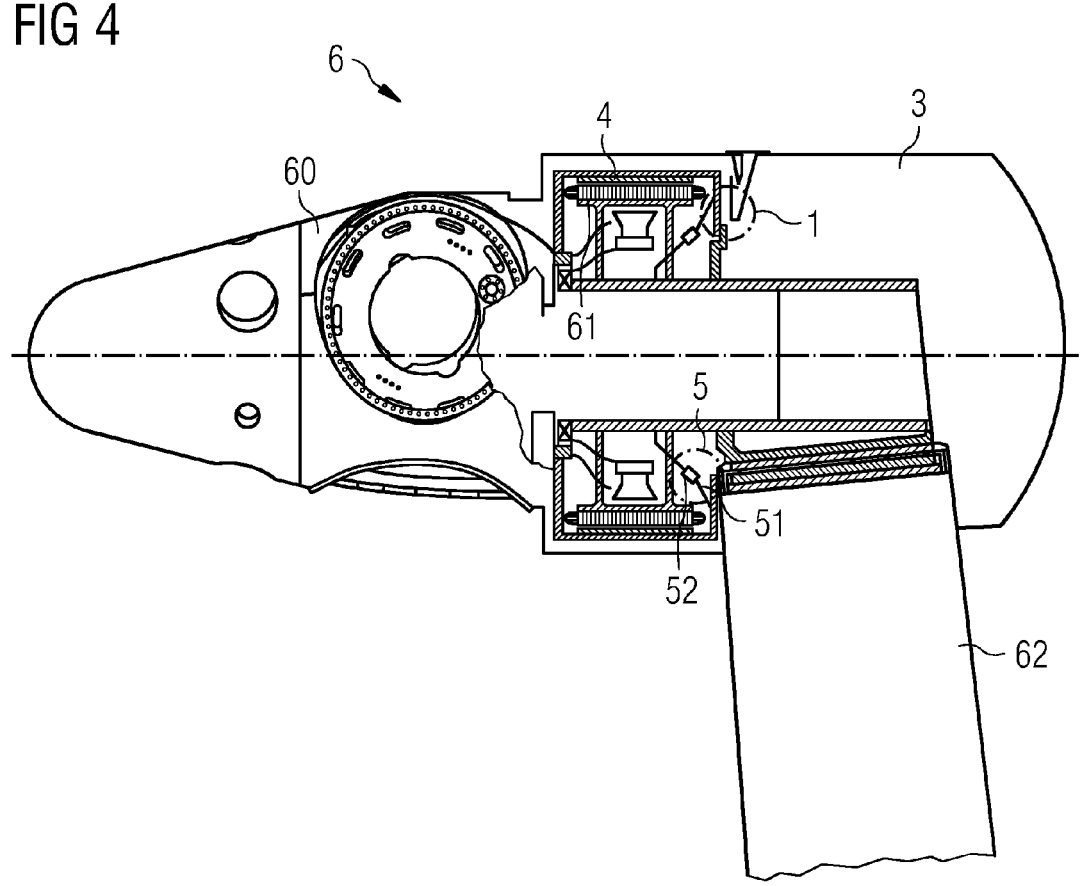
FIG. 4 shows a simplified schematic cross-section of a wind turbine and sealing arrangement

FIG. 4 shows a simplified schematic cross-section of a wind turbine 6, with the sealing arrangement 1 of FIGS. 2 and 3. The diagram only serves to indicate the location of the sealing arrangement 1 in the wind turbine, and does not show all the details of the sealing arrangement 1 as described in FIGS. 2 and 3. A rotary hub 60 (the blades are not shown) is connected to an external rotor 4, which is arranged to rotate about an internal stator arrangement. A nacelle 3 or canopy 3 encloses various parts of the generator 6 and is mounted on top of a tower 62.

Here, any moisture that is deflected away from the brake disc 2 by the sealing arrangement 1 flows along the outside of the interface seal part and may be collected at the bottom and transported to the exterior through an opening in the base of the canopy 3. To ensure that the interior of the generator cavity 61 (to the left of the sealing arrangement 1 in the diagram) is protected from the damaging effects of moisture and salt, an additional sealing arrangement 5 is provided on that side of the brake disc 2, and is shown here to comprises a labyrinthine arrangement of a first annular seal part 51 and a second annular seal part 52. These act together to ensure that no moisture may enter the generator cavity interior, even though openings in the brake disc might allow some air to enter that region 61.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A sealing arrangement for a direct drive wind turbine, comprising:
    an interface seal part arranged between a stationary canopy of the direct drive wind turbine and a rotary brake disc of the direct drive wind turbine, the interface seal part is arranged to press against a flat surface of the rotary brake disc to establish a seal between an interior of the stationary canopy and an exterior environment;
    wherein the interface seal part comprises an essentially annular shape corresponding to an annular shape of the rotary brake disc of the direct drive wind turbine; and
    wherein the interface seal part is arranged to bridge a gap between the stationary canopy and the rotary brake disc of the direct drive wind turbine.
2. The sealing arrangement according to claim 1,
    wherein the interface seal part is made of a flexible material.
3. The sealing arrangement according to claim 2,
    wherein the interface seal part is made of a foam.
4. The sealing arrangement according to claim 3,
    wherein the interface seal part is made of a synthetic foam.
5. The sealing arrangement according to claim 3,
    wherein the interface seal part comprises two sealing strips, and
    wherein the two sealing strips are arranged to diverge in the direction of the rotary brake disc.
6. The sealing arrangement according to claim 5,
    wherein each sealing strip comprises a plurality of pleats.
7. The sealing arrangement according to claim 3,
    wherein the interface seal comprises a sealing strip having a plurality of pleats.
8. The sealing arrangement according to claim 1,
    wherein the interface seal part comprises a plurality of sealing strips.
9. The sealing arrangement according claim 1,
    wherein at least one region of the interface seal part comprises a low-friction material.
10. The sealing arrangement according to claim 1,
    wherein the interface seal part comprises a rotary seal part arranged on a rotary brake disc of the wind turbine such that the rotary seal part rotates with the rotary brake disc.
11. The sealing arrangement according to claim 10, further comprising:
    wherein the interface seal part comprises a stationary seal part arranged on a stationary canopy of the wind turbine.
12. The sealing arrangement according to claim 11,
    wherein the stationary seal part and the rotary seal part are realized to provide a nested arrangement in the assembled state of the sealing arrangement.
13. A brake disc for a wind turbine which is realized to accommodate at least a portion of an interface seal part of a sealing arrangement according to claim 1.
14. The brake disc according to claim 13, comprising:
    a recess dimensioned to accommodate a portion of an interface seal part of the sealing arrangement.
15. A wind turbine comprising the brake disc according to claim 13.

* * * * *